US008057561B2

(12) United States Patent
White et al.

(10) Patent No.: US 8,057,561 B2
(45) Date of Patent: Nov. 15, 2011

(54) POLYOXOMETALATE COMPOSITIONS AND METHODS

(75) Inventors: Daniela White, Oswego, IL (US); John Parker, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 1259 days.

(21) Appl. No.: 11/518,674

(22) Filed: Sep. 11, 2006

(65) Prior Publication Data
US 2008/0060277 A1 Mar. 13, 2008

(51) Int. Cl.
C09K 3/14 (2006.01)
B24D 3/02 (2006.01)
C09C 1/68 (2006.01)
B32B 5/16 (2006.01)
B32B 9/00 (2006.01)
B32B 15/02 (2006.01)
B32B 17/02 (2006.01)
B32B 21/02 (2006.01)
B32B 23/02 (2006.01)
B32B 27/02 (2006.01)
B32B 27/38 (2006.01)
C08K 3/10 (2006.01)
C08K 3/22 (2006.01)
C09D 5/08 (2006.01)

(52) U.S. Cl. ............ 51/298; 51/309; 428/403; 428/404; 428/407; 524/406; 524/413

(58) Field of Classification Search .............. 423/606, 423/594.13; 51/309, 298; 524/406, 413; 428/403, 404, 407
See application file for complete search history.

(56) References Cited

U.S. PATENT DOCUMENTS

| | | | | |
|---|---|---|---|---|
| 5,391,638 A | * | 2/1995 | Katsoulis et al. | 525/389 |
| 5,548,052 A | * | 8/1996 | Katsoulis et al. | 528/10 |
| 6,620,037 B2 | * | 9/2003 | Kaufman et al. | 451/559 |
| 6,776,810 B1 | * | 8/2004 | Cherian et al. | 51/307 |
| 6,976,904 B2 | * | 12/2005 | Li et al. | 451/28 |
| 2002/0168923 A1 | * | 11/2002 | Kaufman et al. | 451/36 |
| 2003/0072811 A1 | * | 4/2003 | Hill et al. | 424/618 |
| 2004/0009671 A1 | * | 1/2004 | Kaufman et al. | 438/692 |
| 2007/0219104 A1 | * | 9/2007 | Grumbine et al. | 510/175 |
| 2008/0274619 A1 | * | 11/2008 | White et al. | 438/693 |

FOREIGN PATENT DOCUMENTS

EP  1 123 956 A1  10/2001

OTHER PUBLICATIONS

Mizuno, N., Mixon, M. Chem. Rev., vol. 98, p. 199-217, 1998.*
Okun, N.M., Anderson, T.M., Hill, C.L. J. Amer. Chem. Soc., vol. 125, p. 3194-3195, 2003.*
Pope, M.T. Heteropoly and Isopoly Oxometalates. Berlin, Germany: Springer-Verlag, 1983.*
Campana, C.F., Chen, Y., Day, V.W., Klemperer, W.G. Sparks, R.A. J. Chem. Soc., Dalton Trans., p. 691-702, 1996.*
Bailey et al. "Heteropolyperoxo- and Isopolyperoxo Tungstates and Molybdates as Catalysts . . . " J. Chem. Soc. Dalton Trans. 1995, pp. 1833-1837.
Cotton et al. Advanced Inorganic Chemistry, 5th Ed., excerpt from Chapter 19 "Elements of 2nd and 3rd transition series" pp. 811-819, John Wiley & Sons, New York (1988).

* cited by examiner

Primary Examiner — Katarzyna Wyrozebski Lee
Assistant Examiner — Anthony H Sheh
(74) Attorney, Agent, or Firm — Thomas E. Omholt; Robert J. Ross; Steven D. Weseman

(57) ABSTRACT

The invention provides an isolated, particulate polyoxometalate complex comprising a water-soluble cationic polymer and a polyoxometalate compound ionically bound to the cationic polymer. The polyoxometalate compound can be an isopolyoxometalate compound, such as an isopolytungstate, or a heteropolyoxometalate compound. The invention further provides a chemical-mechanical polishing composition comprising a preformed polyoxometalate abrasive, as well as a method of chemically-mechanically polishing a substrate therewith.

27 Claims, 1 Drawing Sheet

POLYOXOMETALATE COMPOSITIONS AND METHODS

FIELD OF THE INVENTION

This invention relates to polishing compositions and methods for polishing a substrate using the same. More particularly, this invention relates to polyoxometalate compositions and chemical-mechanical polishing methods utilizing the polyoxometalate compositions as an abrasive.

BACKGROUND OF THE INVENTION

Compositions and methods for chemical-mechanical polishing (CMP) the surface of a substrate are well known in the art. Polishing compositions (also known as polishing slurries, CMP slurries, and CMP compositions) typically contain an abrasive material in an aqueous carrier. A surface of a substrate is abraded to polish the surface by contacting the surface with a polishing pad and moving a polishing pad relative to the surface while maintaining a CMP slurry between the pad and the surface. Typical abrasive materials include silicon dioxide, cerium oxide, aluminum oxide, zirconium oxide, and tin oxide. U.S. Pat. No. 5,527,423 to Neville, et al., for example, describes a method for chemically-mechanically polishing a metal layer by contacting the surface with a polishing slurry comprising high purity fine metal oxide particles in an aqueous medium. Alternatively, the abrasive material may be incorporated into the polishing pad. U.S. Pat. No. 5,489,233 to Cook et al. discloses the use of polishing pads having a surface texture or pattern, and U.S. Pat. No. 5,958,794 to Bruxvoort et al. discloses a fixed abrasive polishing pad.

Conventional polishing systems and polishing methods typically are not entirely satisfactory at planarizing metal-containing semiconductor wafers. In particular, polishing compositions and polishing pads can have less than desirable polishing rates, and their use in the chemical-mechanical polishing of semiconductor surfaces can result in poor surface quality.

The difficulty in creating an effective polishing system for semiconductor wafers stems from the complexity of the semiconductor wafer. Semiconductor wafers are typically composed of a substrate on which a plurality of transistors has been formed. Integrated circuits are chemically and physically connected into a substrate by patterning regions in the substrate and layers on the substrate. To produce an operable semiconductor wafer and to maximize the yield, performance, and reliability of the wafer, it is desirable to polish select surfaces of the wafer (e.g., a metal-containing surface) without adversely affecting underlying structures or topography. In fact, various problems in semiconductor fabrication can occur if the process steps are not performed on wafer surfaces that are adequately planarized. Because the performance of a semiconductor wafer is directly associated with the planarity of its surface, it is crucial to use a polishing composition and method that results in a high polishing efficiency, uniformity, and removal rate and leaves a high quality polish with minimal surface defects.

In conventional CMP techniques, a substrate carrier or polishing head is mounted on a carrier assembly and positioned in contact with a polishing pad in a CMP apparatus. The carrier assembly provides a controllable pressure to the substrate, urging the substrate against the polishing pad. The pad is moved relative to the substrate by an external driving force. The relative movement of the pad and substrate serves to abrade the surface of the substrate to remove a portion of the material from the substrate surface, thereby polishing the substrate. The polishing of the substrate by the relative movement of the pad and the substrate typically is further aided by the chemical activity of the polishing composition and/or the mechanical activity of an abrasive suspended in the polishing composition.

Tungsten is increasing being used as a conductive material to form the interconnections in integrated circuit devices. One way to fabricate planar tungsten circuit traces on a silicon dioxide substrate is referred to as the damascene process. In accordance with this process, the silicon dioxide dielectric surface is patterned by a conventional dry etch process to form holes and trenches for vertical and horizontal interconnects. The patterned surface is coated with an adhesion-promoting layer such as titanium or tantalum and/or a diffusion barrier layer such as titanium nitride or tantalum nitride. The adhesion-promoting layer and/or the diffusion barrier layer are then over-coated with a tungsten layer. Chemical-mechanical polishing is employed to reduce the thickness of the tungsten over-layer, as well as the thickness of any adhesion-promoting layer and/or diffusion barrier layer, until a planar surface that exposes elevated portions of the silicon dioxide surface is obtained. The vias and trenches remain filled with electrically conductive tungsten forming the circuit interconnects.

There is an ongoing need to develop new particulate abrasives for use in CMP compositions that are capable of polishing a semiconductor substrate, particularly a tungsten-containing substrate with a relatively low level of microdefects (i.e., low defectivity), while maintaining suitable polishing removal rates. The present invention provides such materials and CMP compositions. These and other advantages of the invention, as well as additional inventive features, will be apparent from the description of the invention provided herein.

BRIEF SUMMARY OF THE INVENTION

The present invention provides an isolated, particulate polyoxometalate complex, which comprises a water-soluble cationic polymer and a polyoxometalate compound ionically bound to the cationic polymer. The particulate complex is useful as an abrasive in CMP applications, particularly for polishing surfaces comprising tungsten. The polyoxometalate compound can be an isopolyoxometalate compound, such as an isopolytungstate (e.g., a $H_2W_{12}O_{42}^{-10}$ salt, and the like), or a heteropolyoxometalate, such as a Keggin compound. The cationic polymer can be, for example, a cationic homopolymer, a cationic copolymer comprising at least one cationic monomer and at least one nonionic monomer, or a combination of homopolymer and copolymer. Preferably, the cationic polymer is a quaternary ammonium-substituted polymer. In some embodiments the abrasive particles include a metal oxide core.

The present invention also provides a CMP composition comprising abrasive particles and an aqueous carrier. The abrasive particles comprise a preformed polyoxometalate complex, which is a polyoxometalate compound ionically bound to a cationic polymer. The pH of the composition preferably is about 3 or less. In some embodiments, the abrasive particles include a metal oxide core (e.g., a metal oxide such as silica, alumina, titania, ceria, or zirconia) having a coating of the polyoxometalate complex surrounding the core. Preferably, the abrasive particles are present in the composition in an amount in the range of about 0.01 to about 5 percent by weight.

The CMP composition of the invention can optionally include an auxiliary abrasive, such as silica, alumina, titania, zirconia, ceria, or doped silica. In addition, the CMP composition can include one or more oxidizing agents, such as hydrogen peroxide, a persulfate salt, a periodate salt, and the like.

In another aspect, the present invention provides a CMP method for polishing a substrate. The method comprises the steps of contacting a surface of a substrate (e.g., a tungsten-containing substrate) with a polishing pad and an aqueous CMP composition of the present invention, and causing relative motion between the polishing pad and the substrate while maintaining at least a portion of the CMP composition in contact with the surface between the pad and the substrate for a time period sufficient to abrade at least a portion of the surface.

The particulate polyoxometalate complexes and CMP compositions of the invention are effective for abrading substrates including a metal such as tungsten, while simultaneously reducing defectivity and maintaining substrate removal rates compared to CMP compositions utilizing only conventional abrasives.

DETAILED DESCRIPTION OF THE INVENTION

Figure 1:
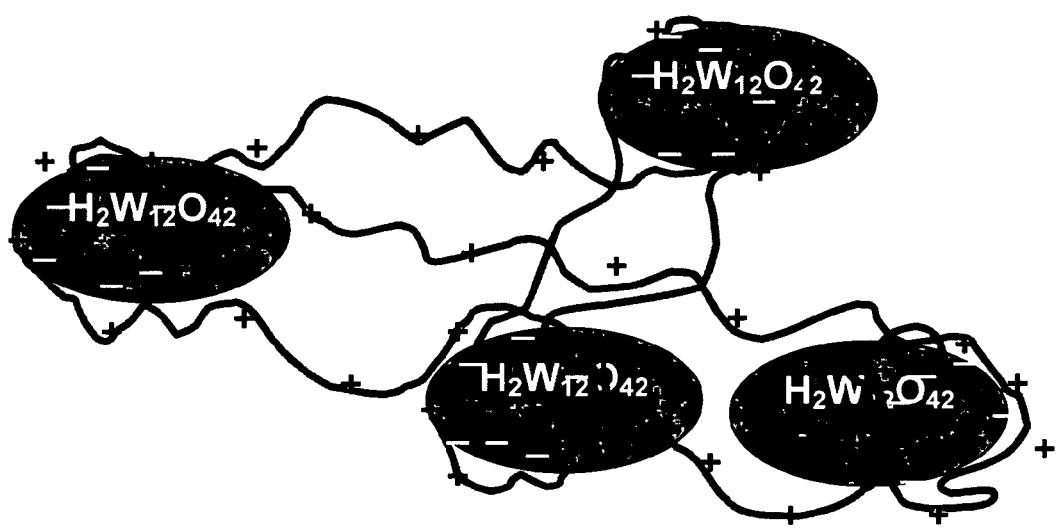
FIG. 1 schematically illustrates a polyoxometalate compound ionically bound to a cationic polymer.

The present invention provides an isolated, particulate polyoxometalate complex. The complex comprises a polyoxometalate compound ionically bound to a cationic polymer. Preferably, the cationic polymer is a cationic homopolymer, a cationic copolymer comprising at least one cationic monomer and at least one nonionic monomer, or a combination of homopolymer and copolymer. Preferably, the cationic polymer is a quaternary ammonium-substituted polymer.

The particulate complex is useful as an abrasive in CMP applications, particularly for polishing surfaces of substrates comprising tungsten. As schematically shown in FIG. 1, the positive charges of the cationic polymer act as counter-ions for the negatively charged polyoxometalate ion (e.g., an isopolytungstate such as $H_2W_{12}O_{42}^{-10}$, $W_{12}O_{39}^{-6}$, and the like), affording agglomerated particles of polymer complexed with the polyoxometalate. Fourier transform infrared spectroscopy (FT-IR) has confirmed that the structure of an isopolytungstate embodiment of the present invention is similar to other isopolytungstates reported in the literature, e.g., Pope, M. T., *Heteropoly and Isopolyoxometalates*, Springer-Verlag, New York (1983).

In some embodiments, the polyoxometalate complex is coated on a metal oxide core particle, e.g., a metal oxide such as silica, alumina, titania, ceria, or zirconia to form a layered aggregate particle. For example, a polyoxometalate complex can comprise a silica particle as a core, with a complex of cationic polymer and polyoxometalate deposited on the surface of the silica particle.

The polyoxometalate portion of the isolated polyoxometalate complexes of the invention can be an isopolyoxometalate or a heteropolyoxometalate. Examples of suitable isopolyoxometalate compounds include, without limitation, an isopolytungstate compound (e.g., a $H_2W_{12}O_{42}^{-10}$ salt, a $W_{12}O_{39}^{-6}$ salt, a $H_2Mo_{12}O_{40}^{-6}$ salt, a $W_{10}O_{32}^{-4}$ salt, and the like), an isopolymolybdate compound (e.g., a $Mo_7O_{24}^{-6}$ salt, a $Mo_8O_{26}^{-4}$ salt, and the like), polytitanates, and the like. Examples of suitable heteropolyoxometalate compounds include, without limitation, a Keggin compound, which is a compound having the general formula $X^{+n}M_{12}O_{40}^{-(8-n)}$, wherein "M" typically is Mo or W, and "X" typically is a polyvalent atom such as $Cu^{II}$, $Zn^{II}$, $Ni^{II}$, $Co^{II}$, $Co^{III}$, $Fe^{III}$, $B^{III}$, $Ga^{III}$, $Rh^{III}$, $Al^{III}$, $Cr^{III}$, $Mn^{IV}$, $Ni^{IV}$, $Ti^{IV}$, $Zr^{IV}$, $Si^{IV}$, $Ge^{IV}$, $P^{V}$, $As^{V}$, $Te^{VI}$, $I^{VII}$ and the like, (e.g., a salt of $SiW_{12}O_{40}^{-4}$ and the like), as well as other heteropolymetalate compounds, such as those having the formulas: $X^{+n}M_{12}O_{42}^{-(12-n)}$, $X^{+n}M_{12}O_{40}^{-(8-n)}$, $(X^{+n})_2M_{18}O_{62}^{-(16-2n)}$, $X^{+n}M_9O_{32}^{-(10-n)}$, $X^{+n}M_6O_{24}^{-(12-n)}$, and $X^{+n}M_6O_{24}H_6^{-(6-n)}$, wherein "M" typically is Mo or W, and "X" typically is as described for the Keggin compounds. Descriptions of isopolyoxometalate and heteropolyoxometalate compounds and the preparation thereof can be found, e.g., in Cotton and Wilkinson, *Advanced Inorganic Chemistry*, Fifth Ed., John Wiley & Sons, New York (1988), pages 811-819; Bailey et al., *J. Chem. Soc., Dalton Trans.*, 1833-1837 (1995); and Nolan et al., *Aust. J. Chem.* 52, 955-963 (1999).

Peroxo complexes of tungsten (VI) can form during oxidation of tungsten (0) in with an oxidizing agent such as hydrogen peroxide. It has been reported that peroxotungstates such as tetraperoxotungstate can be unstable under certain conditions (e.g., at pH greater than 9), and are reported to be thermodynamically unstable, and can decompose slowly, to form tungsten trioxide and isopolytungstate. Such thermodynamic instability may lead to undesirable variability in particle composition during storage over periods of time encountered with commercial products. Peroxotungstates are typically identifiable by FT-IR. In embodiments in which the polyoxometalate is isopolytungstate, it is preferred that the particles are preformed from a tungsten (VI) salt and a cationic polymer in the absence of hydrogen peroxide, to ensure that the particles are free from detectable peroxotungstate materials (e.g., tetraperoxotungstate), as determined by FT-IR.

The cationic polymers suitable for use in the particulate polyoxometalate complexes of the present invention can be a cationic homopolymer or a cationic copolymer. Alternatively, the cationic polymer can be a zwitterionic polymer comprising at least one cationic monomer unit.

The cationic homopolymer can be any suitable cationic homopolymer consisting essentially of cationic monomer repeat units. For example, the cationic polymer can be any suitable cationic polymer consisting essentially of cationic repeat units comprising nitrogen, including but not limited to monomers comprising basic amine groups and quaternized amine groups. The basic amine groups or quaternized amine groups can be acyclic or incorporated into a ring structure. It is also suitable for the cationic polymer to be further modified by alkylation, acylation, ethoxylation, or other chemical reaction, in order to alter the solubility, viscosity, or other physical parameter of the cationic polymer. Examples of cationic homopolymers include polyethyleneimine, ethoxylated polyethyleneimine, polydiallyldimethylammonium halide, poly(amidoamine), poly(methacryloxyloxyethyltrimethylammonium) chloride, poly(methacryloyloxyethyldimethylbenzylammonium)chloride, poly(vinylpyrrolidone), poly(vinylimidazole), poly(vinylpyridine), and poly(vinylamine).

In some embodiments, the cationic polymer can be a cationic homopolymer consisting essentially of monomers comprising sulfonium groups. Sulfonium groups comprise a sulfur atom substituted with three carbon atoms, with the sulfur atom having a positive charge. Non-limiting examples of cationic polymers and cationic monomers comprising sulfonium groups are disclosed in U.S. Pat. No. 4,528,384 to Schmidt et al.

In other embodiments, the cationic polymer can be a cationic homopolymer consisting essentially of monomers comprising phosphonium groups. Phosphonium groups comprise a phosphorous atom substituted with four carbon atoms, with the phosphorous atom having a positive charge. Non-limiting example of cationic polymers and cationic monomers comprising phosphonium groups are disclosed in U.S. Pat. No. 5,439,617 to Akhavan-Tafti.

Alternatively, in some embodiments the cationic polymer can be a copolymer comprising at least one cationic monomer and at least one nonionic monomer, wherein the at least one cationic monomer comprises either more than 50% of the copolymer on a molar basis or about 50% or less of the copolymer on a molar basis. The cationic and nonionic monomers can be any suitable cationic and nonionic monomers.

For example, the cationic monomer can be any suitable cationic monomer(s) comprising nitrogen, including but not limited to monomers comprising basic amine groups and quaternized amine groups. The basic amine groups or quaternized amine groups can be acyclic or can be incorporated into a ring structure. Examples of cationic monomers useful in the context of the invention include but are not limited to ethyleneimine, diallyldimethylammonium halide, methacryloxyethyltrimethylammonium chloride, methacryloyloxyethyidimethylbenzylammonium chloride, 2-aminoethyl methacrylate, N-(3-aminopropyl)methacrylate, vinylimidazole, vinylpyridine, vinylamine, and amidoamines. The cationic monomers can comprise sulfonium and phosphonium groups. Sulfonium groups and phosphonium groups suitable for incorporation into the copolymers can be as set forth above.

The nonionic monomer, for example, can be any suitable nonionic monomer(s), including but not limited to ethylene, propylene, ethylene oxide, propylene oxide, styrene, epichlorohydrin, acrylamide, and mixtures thereof.

The cationic copolymer can be prepared by any suitable technique. For example, the copolymer can be produced by free radical, cationic, anionic, or condensation polymerization. The copolymer can be a random copolymer, alternating copolymer, periodic copolymer, block copolymer (e.g., AB, ABA, ABC, etc.), graft copolymer, or comb copolymer. The cationic copolymer can be further modified by alkylation, acylation, ethoxylation, or other chemical reaction, in order to alter the solubility, viscosity, or other physical parameter of the copolymer.

Preferred cationic polymers for use in the particulate polyoxometalate complexes of the present invention include quaternary ammonium polymers, such as poly(methacryloxyethyltrimethylammonium chloride), poly(methacryloxyethyltrimethylammonium methylsulfate), poly(methacrylamidopropyltrimethylammonium chloride), poly(methacrylamidopropyltrimethylammonium methylsulfate), poly(methacrylamidopropylhydroxyethyldimethylammonium acetate), poly(acryloylethyltrimethylammonium chloride), poly(acryloylethyldimethylethylammonium ethylsulfate), and copolymers thereof.

As used herein, the term "cationic polymer" also encompasses zwitterionic polymers (i.e., polymers having cationic and anionic functional groups in the same polymer), such as poly[(N-3-sulfopropyl)-N-methacrylamidopropyl-N,N-dimethyl ammonium betaine], poly[(N-3-sulfopropyl)-N-methacryloxyethyl-N,N-dimethyl ammonium betaine], copolymers thereof, and the like.

The cationic polymer (i.e., cationic homopolymer or copolymer) can have any suitable weight average molecular weight. Preferably, the cationic polymer will have a weight average molecular weight of about 1,000 Daltons or more, preferably in the range of about 5000 to about 15000 Daltons, as determined by gel permeation chromatography, light scattering, kinematic viscosity, or any other method appropriate for the particular polymer being utilized in the polyoxometalate complex. Methods of determining the molecular weights and molecular weight distributions of polymers are well known in the polymer art. In the Examples presented herein, polymer number average molecular weight ($M_n$) and weight average molecular weight ($M_w$), where reported, were evaluated by gel permeation chromatography (GPC) using a Waters 2695 chromatograph separations module with 2996 PDA and a Viscotek PWXL 3000 SEC column (20 K exclusion limit) and a column heater set at 35° C.

The amount of cationic polymer utilized in the polyoxometalate complexes of the invention depends, in part, on the nature of the cationic polymer (e.g., the monomer formula weight, cationic charge density, and the like). Preferably, the molar equivalent ratio of polymer-to-polyoxometalate compound (on an equivalent weight basis) in the particulate polyoxometalate complexes of the invention is in the range of about 1:50 to about 1:10 equivalents of polymer per equivalent of polyoxometalate, more preferably about 1:20 to about 1:10 equivalents of polymer per equivalent of polyoxometalate.

The term "equivalent weight", as used herein in reference to a cationic polymer, is the weighted average of the formula weights of the monomer units divided by the net cationic charge per monomer unit. For example, a cationic polymer comprising 40 mole percent of methyl methacrylate units (formula weight of 100 grams per mole) and 60 mole percent of allyldimethylammonium monomer units (formula weight of 85 grams per mole, one cationic charge per monomer unit) would have an equivalent weight of about 151.6 grams per mole, i.e. the average formula weight of the monomer units [i.e., 0.4(100)+0.6(85)=91 grams per mol] divided by the average charge per monomer unit [i.e., 0.6]. As applied to a polyoxometalate, the equivalent weight is the molecular weight of the polyoxometalate ion divided by the negative charge of the polyoxometalate ion. For example, the equivalent weight of isopolytungstate ($H_2W_{12}O_{42}^{-10}$) is 288 (i.e., 2880/10).

The particulate polyoxometalate complexes of the present invention preferably have a mean particle size (i.e., the mean of the diameters of spheres which just encompass the particles) in the range of about 100 nm to about 5000 nm (about 0.1 μm to about 5 μm), based on light scattering measurement. More preferably, the particulate polyoxometalate complexes have a mean particle size in the range of about 500 nm to about 2000 nm.

The present invention also provides a CMP composition comprising a preformed particulate polyoxometalate complex of the invention as an abrasive. The abrasive particles can comprise a polyoxometalate complex, by itself, or coated on a metal oxide core (e.g., silica or alumina) as described herein.

The CMP composition of the invention can optionally include an auxiliary abrasive. The auxiliary abrasive can be any abrasive material suitable for use in CMP processes, such as silica, alumina, titania, zirconia, ceria, doped silica, and combinations thereof.

In addition, the CMP composition can include one or more oxidizing agents suitable for use in CMP processes. Non-limiting examples of suitable oxidizing agents include hydrogen peroxide, persulfate salts (e.g., ammonium persulfate, and potassium persulfate), periodate salts (e.g., potassium periodate, ammonium periodate, and the like), and combinations thereof. Preferred oxidizing agents include hydrogen peroxide, ammonium persulfate, and potassium iodate.

The preformed particulate polyoxometalate complex can be present in the CMP compositions of the invention as an abrasive in any suitable amount. The amount of polyoxometalate complex abrasive present in the CMP composition typically is in the range of about 0.01 to about 5 percent by weight. Preferably, the amount of preformed polyoxometalate complex present in the CMP composition is in the range of about 0.01 to about 1 percent by weight.

The preformed polyoxometalate complex abrasive desirably is suspended in the CMP composition, more specifically in the aqueous component of the CMP composition. When the abrasive is suspended in the CMP composition, the abrasive preferably is colloidally stable. The term colloid refers to the suspension of abrasive particles in the liquid carrier. Colloidal stability refers to the maintenance of that suspension over time. In the context of this invention, a particulate polyoxometalate complex abrasive is considered colloidally stable if, when the abrasive is placed into a 100 mL graduated cylinder and allowed to stand without agitation for a time of 2 hours, the difference between the concentration of particles in the bottom 50 mL of the graduated cylinder ([B] in terms of g/mL) and the concentration of particles in the top 50 mL of the graduated cylinder ([T] in terms of g/mL) divided by the initial concentration of particles in the abrasive composition ([C] in terms of g/mL) is less than or equal to 0.5 (i.e., $([B]-[T])/[C] \leq 0.5$). The value of $([B]-[T])/[C]$ desirably is less than or equal to 0.3, and preferably is less than or equal to 0.1.

The CMP compositions of the invention preferably have a pH in the range of about 1 to about 3. The CMP compositions can optionally comprise one or more pH buffering materials, for example, ammonium acetate, disodium citrate, and the like. Many such pH buffering materials are well known in the art.

The CMP compositions of the invention optionally can comprise one or more additives, such as a surfactant, a rheological control agent (e.g., a viscosity enhancing agent or coagulant), a corrosion inhibitor, a dispersant, a biocide, and the like.

The CMP compositions of the invention can be prepared by any suitable technique, many of which are known to those skilled in the art. The CMP composition can be prepared in a batch or continuous process. Generally, the CMP composition can be prepared by combining the components thereof in any order. The term "component" as used herein includes individual ingredients (e.g., acids, bases, and the like) as well as any combination of ingredients (e.g., acids, bases, surfactants, and the like). For example, the preformed particulate polyoxometalate complex can be dispersed in water, and any additional additive materials such as rheological control agents, buffers, and the like can then be added, and mixed by any method that is capable of incorporating the components into the CMP composition. The pH can be adjusted at any suitable time. Oxidizing agents, when utilized, are typically added just prior to use.

The CMP compositions of the present invention also can be provided as a concentrate, which is intended to be diluted with an appropriate amount of water prior to use. In such an embodiment, the CMP composition concentrate can comprise a preformed particulate polyoxometalate-cationic polymer complex and other components dispersed or dissolved in aqueous solvent in amounts such that, upon dilution of the concentrate with an appropriate amount of aqueous solvent, each component of the polishing composition will be present in the CMP composition in an amount within the appropriate range for use.

The invention also provides a method of chemically-mechanically polishing a substrate comprising (i) contacting a substrate (e.g., a tungsten-containing substrate) with a polishing pad and a CMP composition described herein, and (ii) moving the polishing pad relative to the substrate with at least a portion of the CMP composition therebetween, thereby abrading at least a portion of the substrate to polish the substrate. The CMP composition preferably has a pH of about 3 or less and includes an abrasive comprising a particulate complex of a polyoxometalate compound and a cationic polymer, as described herein.

The CMP methods of the present invention can be used to polish any suitable substrate, and is especially useful for polishing semiconductor substrates comprising metals. Suitable substrates include, without limitation, wafers used in the semiconductor industry. The CMP methods of the invention are particularly well-suited for planarizing or polishing a substrate that includes tungsten metal.

The CMP methods of the present invention are particularly suited for use in conjunction with a chemical-mechanical polishing apparatus. Typically, the CMP apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and a CMP composition of the invention and then moving the polishing pad relative to the substrate, so as to abrade at least a portion of the substrate to polish the substrate.

A substrate can be planarized or polished with a CMP composition of the invention using any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353 to Sandhu et al., U.S. Pat. No. 5,433,651 to Lustig et al., U.S. Pat. No. 5,949,927 to Tang, and U.S. Pat. No. 5,964,643 to Birang et al. Desirably, the inspection or monitoring of the progress of the polishing process with respect to a workpiece being polished enables the determination of the polishing end-point, i.e., the determination of when to terminate the polishing process with respect to a particular workpiece.

The following examples further illustrate the invention but, of course, should not be construed as in any way limiting its scope.

EXAMPLE 1

This example illustrates the preparation of a preformed polyoxometalate complex of the present invention comprising an isopolytungstate salt ionically bound to poly(methacryloxyethyltrimethylammonium chloride).

About 10 grams of tungstic acid ($H_2WO_4$, about 40 mmoles) were dissolved in about 400 g of water and the pH was adjusted to about 9 with 14 g of 30% aqueous ammonia solution. The resulting ammonium tungstate solution was then added (dropwise), with vigorous stirring to about 700 g of a solution with the following composition: about 16 ppm $Fe(NO_3)_3$, about 320 ppm malonic acid, about 1000 ppm glycine, and about 230 ppm (a total of about 0.16 grams of polymer, about 0.77 mmoles) of polymadquat (i.e., poly (methacryloxyethyltrimethylammonium) chloride), over a four hour period at room temperature, while maintaining the pH at about 2.3. After all the ammonium tungstate was added, the slurry was left stirring overnight so that the condensation/polymerization of tungstate anions and complexation by the cationic quaternary groups of the polymer were completed. The newly formed isopolytungstate/polymer particles were characterized by particle size, and FT IR measurements, then used as abrasive for tungsten CMP. The mean particle size was about 120 to 130 nm (i.e., about 0.12 to about 0.13 μm) as determined by dynamic light scattering using a Horiba 910 particle analyzer. FT-IR confirmed the presence of isopolytungstate in the particles. The concentration of particles in the resulting slurry was calculated to be about 0.85 percent by weight.

EXAMPLE 2

This example illustrates the preparation of preformed particulate polyoxometalate complexes of the present invention comprising an isopolytungstate salt ionically bound to poly (methacryloxyethyltrimethylammonium chloride) and having a silica core.

In a first procedure, about 2 grams of tungstic acid ($H_2WO_4$, about 8 mmoles) was dissolved in about 100 g water and the pH was adjusted to about 9 with about 10 g of 30% aqueous ammonia solution. The resulting ammonium tungstate solution was then added (dropwise) with vigorous stirring to about 700 g of a solution containing about 16 ppm $Fe(NO_3)_3$, about 320 ppm malonic acid, about 1000 ppm glycine, and about 230 ppm polymadquat (a total of about 0.16 grams of polymer, about 0.77 mmoles) maintained at a pH of about 2.3, over a two hour period at room temperature. After all the ammonium tungstate was added, the slurry was left stirring overnight so that the condensation/polymerization of tungstate anions catalyzed by the cationic polymer quaternary groups was completed and then about 20 g of 14% fumed silica dispersion in water was mixed with the slurry. The newly formed silica/isopolytungstate/polymer hybrid particles were characterized by particle size, and FT IR measurements, then used as abrasive for tungsten CMP. The mean particle size was about 2000 to 4000 nm. FT-IR confirmed the presence of isopolytungstate in the particles. The concentration of the particulate complex in the resulting slurry was calculated to be about 0.58 percent by weight.

EXAMPLE 3

In an alternative to the procedure of Example 2, about 2 grams of $H_2WO_4$ was dissolved in about 100 g of water and the pH was adjusted to about 9 with about 10 g of 30% aqueous ammonia solution. The resulting ammonium tungstate solution was then added (dropwise) with vigorous stirring to about 700 g of a fumed silica based slurry over a two hour period at room temperature while maintaining the pH at about 2.3. The slurry contained about 0.5 percent by weight fumed silica, about 16 ppm $Fe(NO_3)_3$, about 320 ppm malonic acid, about 1000 ppm glycine, and about 230 ppm polymadquat. After all the ammonium tungstate was added, the slurry was left overnight under stirring so the condensation/polymerization of tungstate anions and complexation by the cationic polymer quaternary groups was completed. The newly formed silica/isopolytungstate/polymer hybrid particles were characterized by particle size, and FT-IR measurements, then used as abrasive for tungsten CMP. The mean particle size was about 500 to about 1500 nm (0.5 to 1.5 μm). FT-IR confirmed the presence of isopolytungstate in the particles. The concentration of the particulate complex in the resulting slurry was calculated to be about 0.66 percent by weight.

EXAMPLE 4

This example illustrates the preparation of a polyoxometalate complex of the invention comprising a polytitanate in place of isopolytungstate.

About 700 mg of 50% aqueous solution of titanium(IV)bis (ammonium lactate) dihydroxide was added (dropwise) with vigorous stirring to about 700 g of a fumed silica based slurry over about 15 minutes at room temperature while maintaining the pH at about 2.3. The slurry contained about 0.5 percent by weight fumed silica, about 16 ppm $Fe(NO_3)_3$, about 320 ppm malonic acid, about 1000 ppm glycine, and about 230 ppm polymadquat. After all the titanium(IV)bis(ammonium lactate) dihydroxide was added, the slurry was left stirring overnight so that the condensation/polymerization of titanate anions and complexation by the cationic polymer quaternary groups was completed. The newly formed silica/ammonium titanate/polymer hybrid particles were characterized by particle size, FT IR ($\nu$(—O—O—) stretching=1022.09 $cm^{-1}$, $\nu$(Ti—$O_2$)=777.6 $cm_{-1}$) and UV-VIS measurements ($\lambda_{max}$=206 nm). The mean particle size was about 2000-3000 nm (about 2-3 μm). The concentration of the particulate complex in the resulting slurry was calculated to be about 0.54 percent by weight.

EXAMPLE 5

This example illustrates the use of CMP compositions prepared in Examples 1-4 to polish a tungsten surface.

Tungsten blanket wafers were polished using the complexes prepared in Examples 1-4 on a bench-top polisher utilizing a D100 polishing pad, a down pressure of about 3.5 psi, a platen speed of about 120 rpm, a carrier speed of about 60 rpm, and a slurry flow rate of about 150 mL/min. For comparison purposes, tungsten wafers were also polished with a slurry comprising about 0.5% fumed silica, 16 ppm $Fe(NO_3)_3$, about 320 ppm malonic acid, about 1000 ppm glycine, and about 230 ppm (a total of about 0.16 grams of polymer, about 0.77 mmoles) of polymadquat, at a pH of about 2.3 (i.e., without any preformed polyoxometalate particles present). The results are summarized in Table 1.

TABLE 1

| Example | W Removal Rates, Å/min |
|---|---|
| Example 1 | 300 |
| Example 2 | 1400 |
| Example 3 | 2100 |
| Example 4 | 3300 |
| Comparative Slurry (no preformed complex) | 900 |

The data in Table 1 indicate that the polyoxometalate complexes of the invention comprising a silica core coated with a preformed complex of polyoxometalate and cationic polymer afforded a surprisingly higher tungsten removal rate compared to the slurry without preformed polyoxometalate. The particulate polyoxometalate complex of Example 1, without silica, afforded a tungsten removal rate of about 300 Å/min, indicating that the particles are capable of acting as an abrasive even in the absence of a silica core.

Analysis of the tungsten surface and the silica particles after polishing with the comparative slurry indicated that small amounts of particulate isopolytungstate form in situ by condensation polymerization of tungsten (VI) anions formed during the polishing process by reaction of tungsten (0) with hydrogen peroxide. The relatively low concentration of tungsten (VI) that forms under such polishing conditions polymerizes to isopolytungstate, but also produces some tetraperoxotungstate. The isopolytungstate then forms a complex with some of the quaternary cationic polymer present in the slurry. The amount of complex formed under these conditions is relatively small, but may contribute, to some extent, to the overall removal rate of tungsten observed with the comparative slurry. Use of preformed polyoxometalate having a silica core provided significantly superior removal rates, however. In addition, compositions having preformed polyoxometalate complexes can be utilized for polishing any surface, including surfaces that do not comprise tungsten.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An abrasive particle comprising a polyoxometalate complex and a metal oxide core, wherein the polyoxometalate complex is a polyoxometalate compound ionically bound to a cationic polymer, wherein the metal oxide core is surrounded by a coating comprising the polyoxometalate complex, and the mean particle size of the abrasive particle is in the range of about 100 nm to about 5000 nm, as determined by light scattering.

2. The abrasive particle of claim 1 wherein the polyoxometalate compound comprises an isopolyoxometalate compound.

3. The abrasive particle of claim 1 wherein the polyoxometalate compound comprises a heteropolyoxometalate compound.

4. The abrasive particle of claim 1 wherein the cationic polymer comprises a quaternary ammonium-substituted polymer.

5. The abrasive particle of claim 1 wherein the cationic polymer comprises poly(methacryloxyethyltrimethylammonium chloride).

6. The abrasive particle of claim 1 wherein the metal oxide core comprises silica.

7. The abrasive particle of claim 1 wherein the polyoxometalate compound comprises an isopolytungstate compound.

8. The abrasive particle of claim 7 wherein the complex is free from tetraperoxotungstate as determined by FT-IR.

9. The abrasive particle of claim 7 wherein the cationic polymer comprises a water soluble quaternary ammonium polymer.

10. The abrasive particle of claim 1 wherein the polyoxometalate compound comprises a polytitanate compound.

11. The abrasive particle of claim 10 wherein the cationic polymer comprises a water soluble quaternary ammonium polymer.

12. A chemical-mechanical polishing (CMP) composition comprising:
(a) preformed abrasive particles comprising a polyoxometalate complex and a metal oxide core, wherein the polyoxometalate complex is a polyoxometalate compound ionically bound to a cationic polymer, wherein the metal oxide core is surrounded by a coating comprising the polyoxometalate complex, and the mean particle size of the abrasive particle is in the range of about 100 nm to about 5000 nm, as determined by light scattering; and
(b) one or more oxidizing agents suitable for use in CMP; and
(c) an aqueous carrier;
wherein the composition has a pH of about 3 or less.

13. The CMP composition of claim 12 wherein the metal oxide core comprises silica.

14. The CMP composition of claim 12 wherein the polyoxometalate compound comprises an isopolytungstate compound.

15. The CMP composition of claim 12 wherein the polyoxometalate compound comprises a polytitanate compound.

16. The CMP composition of claim 12 wherein the cationic polymer comprises a quaternary ammonium-substituted polymer.

17. The CMP composition of claim 12 wherein the abrasive particles are present in the composition in an amount in the range of about 0.01 to about 5 percent by weight.

18. The CMP composition of claim 12 further comprising an auxiliary abrasive selected from the group consisting of silica, alumina, titania, zirconia, and ceria.

19. A method for polishing a substrate comprising abrading a surface of the substrate with the abrasive particle of claim 1.

20. A chemical-mechanical polishing (CMP) method for polishing a substrate, the method comprising the steps of:
(a) contacting a surface of a substrate with a polishing pad an aqueous CMP composition, the CMP composition having a pH of about 3 or less and including preformed abrasive particles comprising a polyoxometalate complex and a metal oxide core, wherein the polyoxometalate complex is a polyoxometalate compound ionically bound to a cationic polymer, wherein the metal oxide core is surrounded by a coating comprising the polyoxometalate complex, and the mean particle size of the abrasive particle is in the range of about 100 nm to about 5000 nm, as determined by light scattering; and
(b) causing relative motion between the polishing pad and the substrate while maintaining a portion of the CMP composition in contact with the surface between the pad and the substrate for a time period sufficient to abrade at least a portion of the surface.

21. The method of claim 20 wherein the metal oxide core comprises silica.

22. The method of claim 20 wherein the polyoxometalate compound comprises an isopolytungstate compound.

23. The method of claim 20 wherein the polyoxometalate compound comprises a polytitanatecompound.

24. The method of claim 20 wherein the cationic polymer comprises a quaternary ammonium-substituted polymer.

25. The method of claim 20 wherein the abrasive particles are present in the CMP composition in an amount of about 0.01 to about 5 percent by weight.

26. The method of claim 20 wherein the CMP composition further comprises an auxiliary abrasive selected from the group consisting of silica, alumina, titania, zirconia, and ceria.

27. The method of claim 20 wherein the CMP composition further comprises an oxidizing agent.

* * * * *